(12) United States Patent
Ernst et al.

(10) Patent No.: US 8,640,189 B1
(45) Date of Patent: Jan. 28, 2014

(54) COMMUNICATING RESULTS OF VALIDATION SERVICES

(75) Inventors: Richard J. Ernst, Rowlett, TX (US); James H. Swedberg, Richardson, TX (US); Matthew J. Hicks, Dallas, TX (US); Herbert T. Riggs, III, Grasonville, MD (US); Matt A. Powers, Farmers Branch, TX (US); Jason E. Ostermann, Plano, TX (US)

(73) Assignee: Raytheon Company, Waltham, MA (US)

( * ) Notice: Subject to any disclaimer, the term of this patent is extended or adjusted under 35 U.S.C. 154(b) by 291 days.

(21) Appl. No.: 13/042,367

(22) Filed: Mar. 7, 2011

(51) Int. Cl.
*H04L 29/06* (2006.01)

(52) U.S. Cl.
USPC ........................................ 726/1; 726/2; 726/3

(58) Field of Classification Search
USPC ..................................................... 726/1, 2, 3
See application file for complete search history.

(56) References Cited

U.S. PATENT DOCUMENTS

| | | | | |
|---|---|---|---|---|
| 7,730,138 B2 * | 6/2010 | Ballinger et al. | ............. | 709/206 |
| 8,005,901 B2 * | 8/2011 | Ballinger et al. | ............. | 709/206 |
| 2005/0080914 A1 * | 4/2005 | Lerner et al. | ............. | 709/230 |
| 2006/0041669 A1 * | 2/2006 | Bemmel et al. | ............. | 709/229 |
| 2006/0048216 A1 * | 3/2006 | Hinton et al. | ............. | 726/8 |
| 2006/0080352 A1 * | 4/2006 | Boubez et al. | ............. | 707/102 |
| 2008/0244692 A1 * | 10/2008 | Chang | ............. | 726/1 |
| 2012/0185911 A1 * | 7/2012 | Polite et al. | ............. | 726/1 |

OTHER PUBLICATIONS

U.S. Appl. No. 13/042,300 entitled "*Validating Network Communications*", by Jason E. Ostermann, et al, 61 pages of specification, claims, abstract, and drawings, filed Mar. 7, 2011.
"*Protecting Sensitive Compartmented Information Within Information Systems (DCID 6/3)—Manual*", www.fas.org/irp/offdocs/dcid-6-3-manual.pdf, 156 pages, May 24, 2000.
Ostermann, Jason, "*Raytheon DSCDS Intro*", www.ucdmo.gov/.../ Ostermann_Raytheon%20DSCDS_09022009.pdf, ,11 pages, Jun. 25, 2009.
McPeak, John David, *UCDMO Interface with the Comprehensive National CyberSecurity Initiative (CNCI)*, ISO, UCDMO, www.ucdmo.Rov/.../McPeak_UCDMO-CNCI_Final_09022009.pdf, 11 pages, Aug. 31, 2009.
*Unified Cross Domain Management Office (UCDMO)*, UCDMO Conference 2009 Presentations, http://www.ucdmo.gov/conference09.html, 2 pages, Aug.-Sep. 2009.

(Continued)

*Primary Examiner* — Brandon Hoffman
*Assistant Examiner* — Thong Truong
(74) *Attorney, Agent, or Firm* — Schwegman, Lundberg & Woessner, P.A.

(57) ABSTRACT

In certain embodiments, a method includes receiving from a validation system a request to apply a first policy service to a message. The validation system determines whether the message may be transmitted to a second network by validating a plurality of tokens associated with the message. The method includes receiving at least one result from a policy service engine of applying the first policy service to the message and determining at least one predefined assertion based on the received at least one result. The message includes generating a first token by encrypting the at least one predefined assertion using a first parameter associated with the first service node and not the second service node. The method includes sending the message and the first token to the validation system.

24 Claims, 5 Drawing Sheets

(56) References Cited

OTHER PUBLICATIONS

"*Distributed Service Oriented Architecture (SOA) Compatible Cross Domain Service (DSCDS)*", Overview of Booz Allen's Proposed Solution, Unified Cross Domain Management Office Conference, Booz|Allen|Hamilton, San Diego, CA, www.ucdmo.gov/.../Morris_BAH%2ODSCDSoverview_09022009.pdf, 12 pages, Aug. 31-Sep. 3, 2009.

Thomas, Scott, "*Cross Domain Solutions (CDS) 2.0: Collaboration Concepts & Applications in the Coalition Context*", UCDMO Conference, Trident Technology Solutions, www.ucdmo.gov/.../Thomas_CDS%202.0%20Coalition%20Context_09032009.pdf, 14 pages. Sep. 2009.

White, Teresa, "*Cross-Domain Enterprise Service (CDES)*", DISA, Defense Information Systems Agency, A Combat Support Agency, www.ucdmo.gov/.../White_%20DISA%20CDES_09012009.pdf, 23 pages. Sep. 2009.

Kubic, Chris, "*An Assured GIG Enterprise; Overview of the IA Component of the GIG*", www.ucdmo.gov/.../Kubic_GIG%20IA%20Overview_v2Final_09012009.pdf; 12 pages, Sep. 1, 2009.

"*Distributed Service Oriented Architecture (SOA)-Compatible Cross Domain Service (DSCDS), DSCDS Overview*", Presentation at the UCDMO Conference, Sep. 2, 2009 by the NSA Cross Domain Solution Products Division, www.ucdmo.gov/.../Roberts_dscdsOverview_09022009.pdf, 12 pages, Sep. 2, 2009.

Siomacco, Dr. Edward M., "*Army Cross Domain Management; A Federated Approach*", America's Army; The Strength of the Nation™, U.S. Army, www.ucdmo.gov/.../Siomacco_Fed%20Approach_09032009.pdf, 13 pages, Sep. 3, 2009.

\* cited by examiner

US 8,640,189 B1

COMMUNICATING RESULTS OF VALIDATION SERVICES

GOVERNMENT RIGHTS

A portion or all of this disclosure may have been made with Government support under government contract number H98230-09-C-0786, awarded by the National Security Agency of the United States Department of Defense. The Government may have certain rights in this disclosure.

BACKGROUND

Network security has become increasingly difficult to enforce. Network security nodes, such as guards, are tasked with complex analyses of network communications and may require highly specialized and expensive configurations. Such network security nodes are often inflexible and difficult to update. Yet, more sophisticated network intruders are overcoming security protections. Updating such systems may be cumbersome and very costly. This may be especially true when protecting networks that are secured for government uses. For example, network security nodes employed as cross-domain guards of networks with differing government security levels have been difficult to update due to stringent requirements of government security policies and complex architectures.

SUMMARY

In certain embodiments, a method includes receiving, at a first service node, from a validation system, a request to apply a first policy service to a message. The validation system resides on a first network and is configured to determine whether the message may be transmitted to a second network by validating a plurality of tokens associated with the message. The plurality of tokens includes tokens generated by the first service node applying the first policy service to the message and a second service node applying a second policy service to the message. The method includes receiving, at the first service node, at least one result from a policy service engine of applying the first policy service to the message. Also, the method includes determining, at the first service node, at least one predefined assertion based on the received at least one result. The method includes generating a first token by encrypting the at least one predefined assertion using a first parameter associated with the first service node and not the second service node. The method further includes sending the message and the first token to the validation system.

In certain embodiments, the first network may include a first security level and the second network may include a second security level that is different than the first security level. The first service node may reside on a third network different than the first network. The first parameter may be a private key associated with the first service node.

In certain embodiments, an apparatus includes a network interface configured to receive from a validation system a request to apply a first policy service to a message. The validation system is residing on a first network. The validation system is configured to determine whether the message may be transmitted to a second network by validating that the message comprises a plurality of tokens. The plurality of tokens includes tokens generated by the apparatus applying the first policy service to the message and a second service node applying a second policy service to the message. The apparatus includes at least one processor configured to receive at least one result from a policy service engine of applying the first policy service to the message. The at least one processor is configured to determine at least one predefined assertion based on the received at least one result and is configured to generate a first token by encrypting the at least one predefined assertion using a first parameter associated with the first service node and not the second service node. The at least one processor is configured to send the message and the first token to the validation system.

Certain embodiments of the present disclosure may provide one or more technical advantages. In certain embodiments, new or different network security technologies or techniques may be implemented quickly and/or efficiently. A modular system of enforcing network security policies in a cross-domain guard may be implemented. External network security services may be incorporated into a cross-domain network security solution.

Certain embodiments of the present disclosure may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Figure 1:
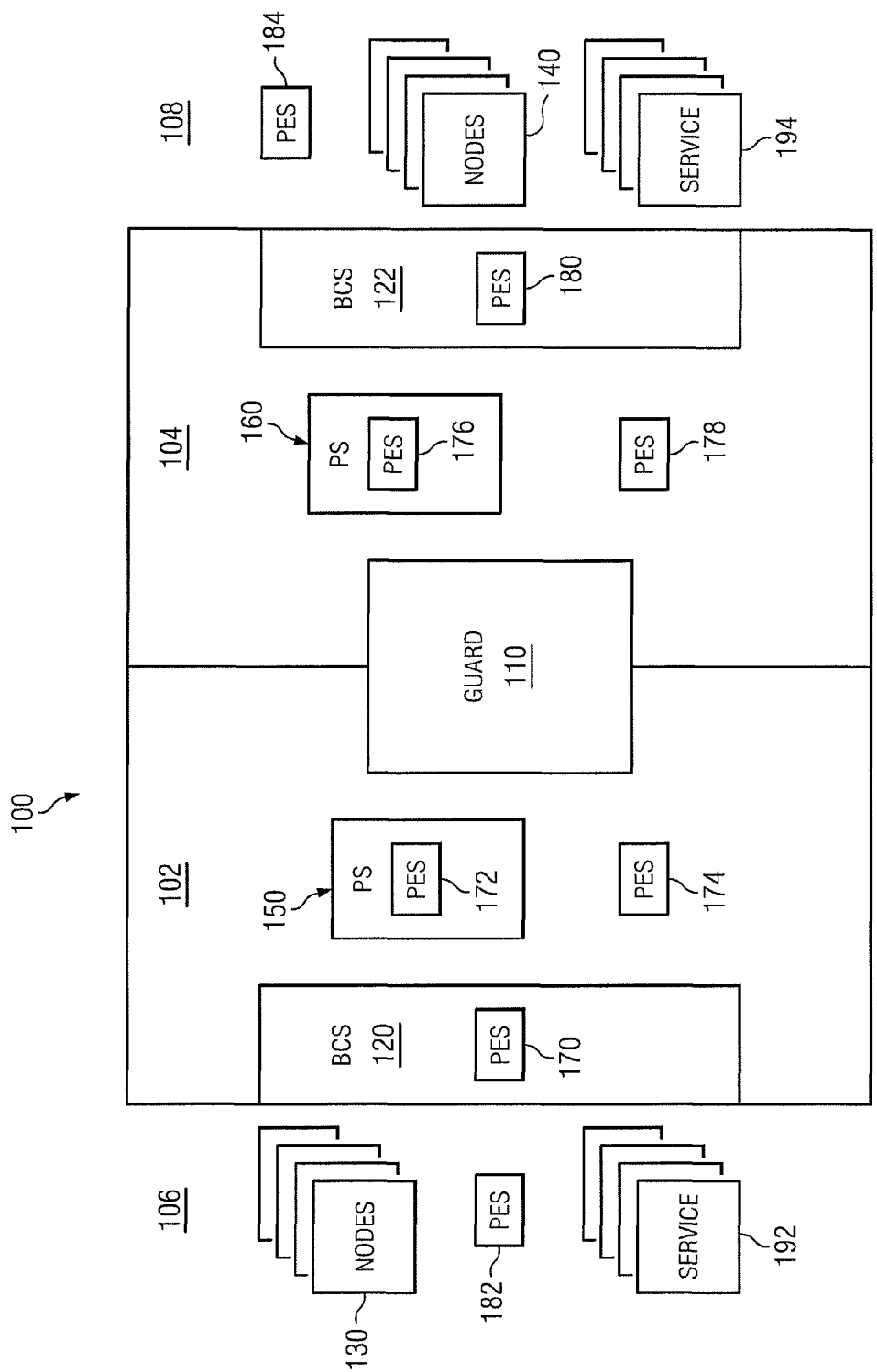
FIG. 1 illustrates an example system for validating network communication.

FIG. 1 illustrates an example system 100 for validating network communication. System 100 includes enclave 102 and enclave 104 separated by guard 110. Communication between enclaves 102 and 104 must pass through guard 110. In system 100, boundary control subsystem 120 separates enclave 102 and external network 106 such that communication between enclaves 102 and 104 passes through boundary control subsystem 120. Similarly, communication between external network 108 and enclave 104 passes through boundary control subsystem 122. Node(s) 130, residing on external network 106, may communicate with node(s) 140, residing on external network 108, in system 100 by having the communication pass through enclaves 102 and 104. Policy subsystem 150 may cause messages to or from nodes 130 to have policy services applied to them. Policy subsystem 160 may cause messages to or from nodes 140 to have policy services applied to them. Policy subsystem 150 and policy subsystem 160 may use a suitable combination of policy enforcement services 170, 172, 174, 176, 178, 180, 182, and 184 to apply the policy services to communication from or to nodes 130 and nodes 140. Policy enforcement services 170, 172, 174, and/or 182 may communicate with one or more of external services 192 (e.g., residing in external network 106) when applying policy services. Policy enforcement services 176, 178, 180, and/or 184 may communicate with one or more of external services 194 (e.g., residing in external network 108) when applying policy services. In some embodiments, system 100 may facilitate communication between nodes 130 and nodes 140 by applying policy services to the messages using one or more of policy enforcement services 170, 172, 174, 176, 178, and 180. Policy subsystems 150 and/or 160 may coordinate the application of the policy services. Guard 110 may verify that the appropriate services have been applied to communications crossing between enclaves 102 and 104.

In some embodiments, enclaves 102 and 104 each may include a networked environment such that nodes within each enclave may communicate with each other but not with nodes in other enclaves. For example, policy subsystem 150 and policy enforcement service 174 may communicate directly within enclave 102 but policy subsystem 150 may not communicate directly with policy subsystem 160 because they are in separate enclaves. Enclaves 102 and 104 are configured such that communication between them passes through guard 110. Enclaves 102 and 104 each may include one or more networks. Enclaves 102 and 104 each may be portions of a network, such as a demilitarized zone (DMZ). Enclaves 102 and 104 each may be different domains or in different domains. Enclaves 102 and 104 each may be a segment of a network, that are each defined by security, change and service policies. In some embodiments, enclaves 102 and 104 each may be distinct from a DMZ network in that they each may not be publicly accessible, but instead they each may lie completely within an internal network. Enclaves 102 and 104 each may be associated with different security levels, such as government security levels. For example, enclave 102 may be associated with a government security level of "Confidential" while enclave 104 may be associated with a government security level of "Top Secret." Example security levels that may be associated with enclaves 102 and 104 include protection levels defined by PROTECTING SENSITIVE COMPARTMENTED INFORMATION WITHIN INFORMATION SYSTEMS (DCID 6/3)—MANUAL, dated May 24, 2000, Director of Central Intelligence Directive. Other examples of security levels that may be associated with enclaves 102 and 104 may include those mentioned by the Department of Defense Information Assurance Certification and Accreditation Process (DIACAP). Enclaves 102 and/or 104 may also be implemented using the Secret Internet Protocol Router Network (SIPRNet) and/or the Non-classified Internet Protocol Router Network (NIPRNet). Other example security levels that may be associated with enclaves 102 and 104 include corporate internal networks, secret networks, top secret networks, Automated Teller Machine networks, and bank networks. In some embodiments, guard 110 may be coupled to more than two enclaves (such as enclaves 102 and 104). In such examples, each of the enclaves coupled to guard 110 may include any suitable combination of components such as boundary control subsystems 120 or 122, policy subsystem 150 or 160, policy enforcement services 170, 172, 174, 176, 178, or 180.

In some embodiments, enclaves 102 and 104 as well as external networks 106 and 108 in some embodiments, may be communicative platforms operable to exchange data or information. Enclaves 102 and 104 as well as external networks 106 and 108 may include packet data networks offering communication interfaces or exchanges between nodes in system 100. Enclaves 102 and 104 and external networks 106 and 108 each may be or include any local area network (LAN), metropolitan area network (MAN), wide area network (WAN), wireless local area network (WLAN), virtual private network (VPN), intranet, Internet, plain old telephone system (POTS), or any other appropriate architecture or system that facilitates communications in a network or telephonic environment, including a combination of any networks or systems described above. The networks may also include wireless technology such as WiMAX, LTE, or any of a variety of cellular data networks. In various embodiments, external networks 106 and 108 each may include firewalls or other equipment or software that create security zones and/or secure networks such as DMZs. For example, nodes 130 may be in a different security zone or area than service nodes 192. Similarly, nodes 140 may be in a different security zone or area than service nodes 194.

In some embodiments, guard 110 may be implemented using any suitable combination of hardware, firmware, and software. For example, guard 110 may be implemented using the RAYTHEON HIGH-SPEED GUARD. Guard 110 may provide one or more controlled network interfaces that reviews and releases sensitive data. Guard 110 may facilitate the distribution of information between varied security classification environments, provide effective interoperability across domains, and/or serve as a link to ensure that data maintains sensitivity levels in information-sharing and transmission processes that occur across domains. Guard 110 may provide certain aspects of memory and processing isolation between data that is received from different network interfaces. Guard 110 may include parallel computer architecture, such as processors, memory modules, and disk storage modules to provide this isolation. Guard 110 may provide Extensible Markup Language (XML) validation and/or protocol header validation and sanitization.

In some embodiments, boundary control subsystems 120 and 122 each may be implemented using any suitable combination of hardware, firmware, and software. The hardware, firmware, or software may include firewalls, intrusion detection systems, gateways (such as a Layer 7 Gateway), authentication modules, and/or other suitable security frameworks. As illustrated in FIG. 1, boundary control subsystems 120 and 122, in some embodiments, may include one or more policy enforcement services (such as policy enforcement services 170 and 180). The one or more policy enforcement services in boundary control subsystems 120 and 122 may be configured as software modules integrated with other components of boundary control subsystems 120 and 122 or they may be a separate hardware, virtual machine, or software module from other aspects of boundary control subsystems 120 and 122. In some embodiments, policy enforcement services 170 and 180 may have different access rights, privileges, trust levels, or other form of security credentials than policy enforcement services 172, 174, 176, and 178. For example, one of nodes 130 may send a Simple Object Access Protocol (SOAP) request destined for one of nodes 140. The request may enter boundary control subsystem 120 and first pass through a firewall, intrusion detection system, and/or intrusion protection system. The request may then pass through a Layer 7 gateway within boundary control subsystem 120 before being sent to policy subsystem 150.

Boundary control subsystems 120 and 122 may be configured to authenticate credentials (i.e., using client certificates) of nodes 130 and 140, perform schema validations on received communications, and generate unique message identifiers for communications sent to policy subsystems 150 and/or 160. For example, if boundary control subsystem 120 detects that a message from node 130 does not have correct XML syntax, boundary control subsystem 120 may reject the message and not allow it to continue into enclave 102. As another example, boundary control subsystem 120 may receive a communication from one of nodes 130 destined for one of nodes 140 that has a message identifier. Boundary control subsystem 120 may replace the message identifier with a different message identifier generated by boundary control subsystem 120. When boundary control subsystem 122 receives the message, boundary control subsystem 122 may send the message to its destination (one of nodes 140).

In some embodiments, nodes 130 and 140 each may be implemented using any suitable combination of hardware, firmware, and software. Each of nodes 130 and 140 may be a personal computer, a cellular telephone, an electronic notebook, a laptop, a personal digital assistant (PDA), smartphone, a server, a virtual machine, an e-reader, a router, a database, or other items that communicate in a network. Nodes 130 may be configured to send or receive communication from nodes 140. For example, one or more of nodes 130 may be clients requesting a file or service from nodes 140. In such examples, one or more of nodes 140 may include a server configured to respond to requests from nodes such as nodes 130. Nodes 130 and 140 may implement or be a part of messaging environments. Suitable messaging environments include, but are not limited to, an e-mail environment, an enterprise messaging environment, an instant messaging environment, a peer-to-peer messaging environment, a chat environment, or other messaging environments. Communication between nodes 130 and 140 may be used in other contexts, such as File Transfer Protocol (FTP) sessions, Web sessions, Wiki sessions, online message boards (such as forums), or other interactive environments. Nodes 130 and 140 may also communicate regarding sending or receiving sensitive or private information. For example, one or more of nodes 130 may request confidential information from one or more of nodes 140 or may transmit confidential information to be stored at one or more of nodes 140. Information transmitted between nodes 130 and 140 may include sensor information, satellite imagery, technical configurations, plans, and reports. Some or all of the information transmitted between nodes 130 may be confidential, privileged, or classified.

For example, one of nodes 130 may be a mobile device, such as a smart phone (e.g. an APPLE IPHONE, a GOOGLE ANDROID device, or a RESEARCH IN MOTION BLACKBERRY device). The mobile device may desire to send data (such as an image, message, geographical, text, audio, video, and binary data) to one of nodes 140. The mobile device may send the data to another one of nodes 130, such as a FTP proxy. The data from the mobile device may then be stored at another one of nodes 130, such as an FTP server. A polling service may operate on another one of nodes 130 that detects the data from the mobile device being stored at the FTP server. The service may then be configured to retrieve the data from the FTP server and send it to boundary control subsystem 120 such that it may be processed and delivered to its destination at one of nodes 140 as described below. The service may be configured to use Web services, such as SOAP, SOAP with attachments, Remote Procedure Calls (RPC), Web Services Addressing (WS-Addressing), encryption protocols (such as XML encryption, Transport Layer Security (TLS), and/or Secure Sockets Layer (SSL)), Java Message Service (JMS), XML-formatted messages or documents, Asynchronous Javascript and XML (AJAX), and other suitable protocols. This example illustrates how a mobile device in a network with a low or public security level may send data or messages to a node in a network with a high, private, or confidential security level.

As another example, one of nodes 140 may communicate a message and/or data (such as an image, message, geographical, text, audio, video, and binary data) to one or more of nodes 130, such as a mobile device. The mobile device may be a smart phone (e.g. an APPLE IPHONE, a GOOGLE ANDROID device, or a RESEARCH IN MOTION BLACKBERRY device). The communication from one of nodes 140 may be in a Web services protocol, such as SOAP, SOAP with attachments, RPC, WS-Addressing, encryption protocols (such as XML encryption, TLS, and/or SSL), JMS, XML-formatted messages or documents, AJAX, and other suitable protocols. The communication may go through boundary control subsystem 122 and be processed by the nodes in enclaves 104 and 102 as discussed below (such as being processed by guard 110). The communication may be sent from boundary control subsystem 120 to one of nodes 130, such as a server. The server may then communicate the communication to the mobile device (which is one of the nodes 130). The server may communicate the message using a text message, e-mail, or other suitable communication protocols. This example illustrates how a node in a network with a high, private, or confidential security level may send data or messages to a mobile device in a network with a low or public security level.

In some embodiments, policy subsystems 150 and 160 each may be implemented using any suitable combination of hardware, firmware, and software. Policy subsystem 150 may be configured to receive communication from nodes 130 and determine what actions or services should be performed on the communication in order for guard 110 to validate the communication. Similarly, policy subsystem 160 may be configured to receive communication from nodes 140 and determine what actions should be performed on the communication in order for guard 110 to validate the communication. Policy subsystems 150 and 160 may use one or more policies to determine which services should be performed on communication. For example, the policies may specify one or more services to be applied to the communication based on the type of communication, the source of the communication, the destination of the communication, or the content of the communication. Policy subsystems 150 and 160 may be configured to invoke one or more of policy enforcement services 170, 172, 174, 176, 178, 180, 182, and 184 when applying one or more services to communication from nodes 130 or 140. Policy subsystems 150 and 160 may schedule the application of services amongst policy enforcement services 170, 172, 174, 176, 178, 180, 182, and 184 and receive the results of the application of those services. Policy subsystems 150 and 160 may bundle assertions regarding the application of services received from one or more of policy enforcement services 170, 172, 174, 176, 178, 180, 182, and 184 to the communication and provide the bundle to guard 110. For example, policy subsystems 150 and 160 each may be an orchestrator that manages the application of policy enforcement services.

In some embodiments, policy enforcement services 170, 172, 174, 176, 178, 180, 182, and 184 each may be implemented using any suitable combination of hardware, firmware, and software. They each may offer services used to analyze communication between nodes 130 and 140. Examples of such services may include: type validation (ensuring that data is of the type it asserts itself to be), data transformation (modifying the payload in accordance with a policy, such as stripping addresses or other sensitive data), malware detection, keyword scanning, dirty word detection, sanitization, transformation, validation, scanning for sensitive or confidential information, analysis of the source or destination of the communication, determination of whether the communication conforms to one or more government security protocols, and verification of security or authentication information (such as certificates, signatures, user name and password combinations, and hashes).

Each of policy enforcement services 170, 172, 174, 176, 178, 180, 182, and 184 may have a parameter, such as a private key or digital signature. For example, this may be an RSA-1024 signature. After determining results of applying one or more services, each of policy enforcement services 170, 172, 174, 176, 178, 180, 182, and 184 may return assertions to policy subsystems 150 and 160 representative of the results. Such assertions may be signed or authenticated using the private key or digital signature particular to the policy enforcement service sending the assertion. One or more of policy enforcement services 170, 172, 174, 176, 178, 180, 182, and 184 may perform a hash of the assertion. Each of policy enforcement services 170, 172, 174, 176, 178, 180, 182, and 184 may send such assertions, hashes of assertions, and/or digitally authenticated assertions to policy subsystems 150 and/or 160.

FIG. 1 provides various example locations for the policy enforcement services. A policy enforcement service may be located within enclaves 102 and/or 104 (such as policy enforcement services 174 and 178). A policy enforcement service may be colocated or a part of policy subsystems 150 and/or 160 (such as policy enforcement services 172 and 176). A policy enforcement service may also be colocated or within boundary control subsystems 120 and/or 122 (such as policy enforcement services 170 and 180). A policy enforcement service may be located outside of enclaves 102 and/or 104 and in external networks 106 and/or 108 (such as policy enforcement services 182 and 184). The above locations are merely examples of where a policy enforcement service may be situated within system 100. Additionally any suitable combination of the above (and other) locations may be used in various embodiments of system 100.

In some embodiments, external services 192 and 194 each may be implemented using any suitable combination of hardware, firmware, and software. External service 192 may reside in external network 106 and not enclave 102. Similarly, external service 194 may reside in external network 108 and not enclave 104. Root certificates and/or other authentication parameters regarding external services 192 and 194 may be stored at boundary control subsystems 120 and/or 122 (such as using X.509 credentials). External services 192 and 194 each may be used by one or more of policy enforcement services 170, 172, 174, 176, 178, 180, 182, and 184 when they apply services to communication between nodes 130 and 140. For example, external services 192 and 194 may provide services such as access to databases located outside of enclaves 102 and 104, enterprise services, authentication services, malware detection, and other suitable services. This may be advantageous, in some examples, in that services not available in enclaves 102 and 104 may be used to provide analysis to communication between nodes 130 and 140 that would otherwise not be available.

An example of such a service is the Web Service for All-Source Releasability and Dissemination (WiSARD) deployed by National Geospatial-Intelligence Agency (NGA). WiSARD may provide the capability for enforcing complex and evolving release and distribution policies of intelligence products. WiSARD may determine the releasability of a file based on metadata associated with the file. Another example of such a service is a malware detection system implemented using a cluster of detection technologies, such as RAYTHEON'S RSHIELD system.

An example operation of system 100 processing a request for data is now described. A node 130 (in this example referred to as a "client") may send a request destined for a node 140 (in this example referred to as a "server") requesting data such as image data. In this example, the client is associated with enclave 102 while the server is associated with enclave 104. In this example, enclave 104 has a security level that is higher than enclave 102. The request by the client first enters boundary control subsystem 120 where the client's credentials are authenticated. Boundary control subsystem 120 also creates a unique message identifier for the request and sends it to policy subsystem 150.

Policy enforcement service 170 may generate an assertion after analyzing the request and send the assertion (or a hashed and/or digitally signed or encrypted assertion) to policy subsystem 150. Policy subsystem 150 may request one or more of policy enforcement services 174 to apply policy services to the request based on one or more policies selected by policy subsystem 150. In this example, policy subsystem 150 requests that a validation service provided by one policy enforcement service 174 and a Schematron service (i.e., a rule-based validation service regarding patterns in XML trees) provided by another policy enforcement service 174 be applied to the client's request. Policy subsystem 150 receives the results of these policy enforcement services applying these services and bundles the assertions (or hashed and/or encrypted versions of the assertions) from policy enforcement services 170 and 174 with the client's request. Policy subsystem 150 sends the bundle to guard 110.

In this example, guard 110 analyzes the request and selects a policy appropriate to the client's request. Using the policy, guard 110 validates the bundle of assertions (or hashed and/or encrypted assertions) received from policy subsystem 150. Guard 110 may also validate the order of the assertions. Guard 110 then removes the bundled assertions from the client's request and attaches an assertion (that may be hashed or encrypted) indicating the approval of guard 110 to the client's request and sends the request to policy subsystem 160. Policy subsystem 160 may send the client's request with the assertion of guard 110 to boundary control subsystem 122. In some embodiments, policy subsystem 160 may apply policy enforcement services to the client's request before sending the client's request to boundary control subsystem 122. The client's request may have the unique identifier provided by boundary control subsystem 120 when arriving at boundary control subsystem 122. Boundary control subsystem 122 may then send the client's request without the assertion of guard 110 to the server (i.e., one of nodes 140 as discussed above). In some embodiments, boundary control subsystem 122 may validate and remove assertions that may be part of the message or included in a package with the message, such as assertions from guard 110 or policy enforcement services invoked by policy subsystem 160.

In this example, the server sends a response destined for the client (i.e., one of nodes 130 as discussed above) that includes the requested image data. The response is received at boundary control subsystem 122. Boundary control subsystem 122 may analyze the response and determine it is suitable to send the response to policy subsystem 160. Boundary control subsystem 122 may authenticate the credentials of the server and may perform a schema validation. Boundary control subsystem 122 may generate a unique identifier for the response or may apply the same identifier for the response and was used in the request and send this to policy subsystem 160.

Policy enforcement service 180 may send an assertion (that may be encrypted and/or hashed) to policy subsystem 160 indicating what policy services were performed at boundary control subsystem 122. Policy subsystem 160 selects one or more policies in response to analyzing the response. Policy subsystem 160 determines that the response should be sent to a validation service and to a WiSARD service. In this example, the WiSARD service is implemented as an external service 194. Policy subsystem 160 may send requests to have these services performed on the responses to one or more policy enforcement services 178. One policy enforcement service 178 may perform the validation service and return an assertion (that may be encrypted and/or hashed) to policy subsystem 160. Another policy enforcement service 178 may send a request in an appropriate format to the WiSARD service (which is implemented at a node of external services 194). The request to the WiSARD service may go through (and be validated by) boundary control subsystem 122. The WiSARD service may communicate its response back to the policy enforcement service 178 that requested the service. This response may also go through (and be validated by) boundary control subsystem 122. After receiving the results from the WiSARD service, policy enforcement service 178 develops one or more assertions that reflect the received results. Policy enforcement service 178 sends the assertions (that may be encrypted and/or hashed) to policy subsystem 160.

In this example, after receiving responses to all the requests for services sent by policy subsystem 160, policy subsystem 160 bundles the assertions (or hashed and/or encrypted versions of the assertions) from policy enforcement services 178 and 180 with the server's response. Policy subsystem 160 sends the bundle to guard 110. Guard 110 analyzes the server's response and selects an appropriate policy. Using the policy, guard 110 validates the bundle of assertions (or hashed and/or encrypted assertions) received from policy subsystem 160. Guard 110 then removes the bundled assertions from the server's response and attaches an assertion (that may be hashed or encrypted) indicating the approval of guard 110 to the server's response. Guard 110 sends the bundle to policy subsystem 150. Policy subsystem 150, after analyzing the server's response, validates the assertion of guard 110. After validating the assertion of guard 110, policy subsystem 150 may send the server's response with the assertion of guard 110 to boundary control subsystem 120. The response may include the unique identifier generated by boundary control subsystem 122. Boundary control subsystem 120 may then send the server's response without the assertion of guard 110 to the client (i.e., node 130 as discussed above).

The example described above may also be used with services other than WiSARD, such as a malware detection service. For example, a malware detection service that receives requests and sends responses using Web services, SOAP, SOAP with attachments, RPC, WS-Addressing, encryption protocols (such as XML encryption, TLS, and/or SSL), JMS, XML-formatted messages or documents, and/or AJAX may be used in system 100 according to the example described above.

Figure 2:
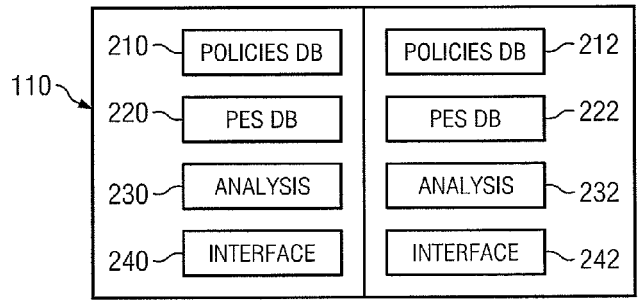
FIG. 2 is a block diagram of one embodiment of guard.

FIG. 2 is a block diagram of one embodiment of guard 110 of FIG. 1. In this example, guard 110 includes policies databases 210 and 212, policy enforcement service databases 220 and 222, analysis modules 230 and 232, and interfaces 240 and 242. Guard 110 may use blocks 210, 220, 230, and 240 when receiving and analyzing communication from one enclave, such as enclave 102 of FIG. 1, and may use blocks 212, 222, 232, and 242 when receiving and analyzing communication with a different enclave, such as enclave 104 of FIG. 1. Interfaces 240 and 242 may be network interfaces that are coupled to different enclaves.

In some embodiments, databases 210, 212, 220, and 222 may be implemented using a variety of database structures. The databases may be row-oriented or column-oriented. They may include relational databases and/or object-oriented databases. Databases 210, 212, 220, and 222 may be indexed and accessed in a variety of manners, including by utilizing an operating system or through one or more networks.

In some embodiments, 210, 212, 220, and 222 may be implemented in one database such that separate tables within the database may be used to store the information contained in databases 210, 212, 220, and 222. In some embodiments, the information in databases 210, 212, 220, and 222 may be stored using one or more files instead of databases, such as a set of flat files. In such cases, databases 210, 212, 220, and 222 may be implemented as one or more files instead of as databases. Other suitable storage structures or techniques aside from databases may be used when implementing databases 210, 212, 220, and 222.

In some embodiments, policies database 210 may include policies used by guard 110 when analyzing messages from the enclave coupled to interface 240.

Similarly, policies database 212 may include policies used by guard 110 when analyzing messages from the enclave coupled to interface 242. Such policies may include what services should have been applied to the communication in order to validate the communication. The policies may also specify an order in which the services should be applied to the communication. In addition, the policies may state which policy enforcement services (such as policy enforcement services 170, 172, 174, 176, 178, and 180 of FIG. 1) should be used to apply the services to the communication.

In some embodiments, policy enforcement service database 220 may include information regarding policy enforcement services applied to messages from the enclave coupled to interface 240. For example, if interface 240 is coupled to enclave 102 of FIG. 1, policy enforcement service database 220 may include information regarding policy enforcement services 170, 172, 174, and 182 of FIG. 1. Similarly, policy enforcement service database 222 may include information regarding policy enforcement services applied to messages from the enclave coupled to interface 242. For example, if interface 242 is coupled to enclave 104 of FIG. 1, policy enforcement service database 220 may include information regarding policy enforcement services 176, 178, 180, and 184 of FIG. 1. Examples of information included in policy enforcement service databases 220 and 222 include identification information, network location information (such as addresses), encryption parameters, digital signatures, private and public keys, hash parameters, available services and other suitable information regarding policy enforcement services.

In some embodiments, analysis modules 230 and 232 may be implemented using any suitable combination of hardware, firmware, and software. Analysis module 230 may be used to analyze communication from interface 240 while analysis module 232 may be used to analyze communication from interface 242. Analysis modules 230 and 232 may access one or more policies in policies database 210 and 212, respectively, after determining certain aspects of the communication they are each analyzing, such as the type of communication, the source of the communication, and/or the destination of the communication. The policies accessed may specify which services should have been applied to the communication and what results should have been generated due to the application of those services in order for the communication to be validated. Analysis modules 230 and 232 may use policy enforcement service databases 220 and 222, respectively, when they are each analyzing the communication to determine whether it complies with the policies retrieved from policies databases 210 and 212, respectively. For example, analysis modules 230 and 232 may use policy enforcement service databases 220 and 222 to decrypt information in the communications they are analyzing as well as verify that the identities of the policy enforcement services that have been applied to the communications they are analyzing.

Figure 3:
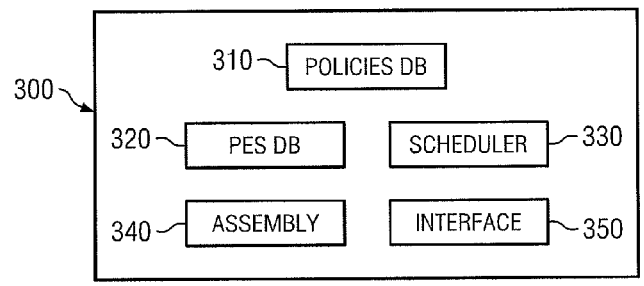
FIG. 3 is a block diagram of one embodiment of a policy subsystem.

FIG. 3 is a block diagram of one embodiment of a policy subsystem 300. Some or all of the components of policy subsystem 300 may be used, in some embodiments, to implement policy subsystem 150 and/or 160 of FIG. 1. Policy subsystem 300 may include policies database 310, policy enforcement services database 320, scheduler module 330, assembly module 340, and interface 350. Blocks 310, 320, 330, 340, and 350 each may be implemented using any suitable combination of hardware, firmware, and software. Blocks 310, 320, 330, 340, and 350 each may reside on the same hardware, different hardware, or be combined in any suitable combination of hardware devices.

In some embodiments, policies database 310 may include policies used by policy subsystem 300 when analyzing messages received at interface 350. Such policies may include what services should have been applied to the communication in order to validate the communication. The policies may also specify an order in which the services should be applied to the communication. In addition, the policies may state which policy enforcement services (such as policy enforcement services 170, 172, 174, 176, 178, and 180 of FIG. 1) should be used to apply the services to the communication. Policies in policies database 310 may be configured as a series of branch determinations. The policies may use a series of conditional "if" statements to direct the operation of policy subsystem 300. For example, a policy may specify that if a policy enforcement service (such as policy enforcement service 172 of FIG. 1) indicates that a message did not pass a "dirty word" check, the policy may specify not to allow the message to continue. As another example, a policy may specify that if a message is determined to have a "dirty word," but the message is from and/or to one or more particular users, then the message should be allowed to proceed. In some embodiments, policies in policies database 300 may be implemented using Business Process Execution Language (BPEL) flows.

In some embodiments, policy enforcement service database 320 may include information regarding policy enforcement services that may be applied to messages received at interface 350. For example, if interface 350 is coupled to enclave 102 of FIG. 1, policy enforcement service database 320 may include information regarding policy enforcement services 170, 172, 174, and 182 of FIG. 1. If interface 350 is coupled to enclave 104 of FIG. 1, policy enforcement service database 320 may include information regarding policy enforcement services 176, 178, 180, and 184 of FIG. 1. Examples of information included in policy enforcement service database 320 include identification information, network location information (such as addresses), encryption parameters, digital signatures, private and public keys, hash parameters, available services, and other suitable information regarding policy enforcement services.

In some embodiments, scheduler module 330 may be configured to determine what services should be applied to communication received at interface 350. Scheduler module 330 may retrieve one or more policies from policies database 310 and compare attributes of the communication to the retrieved policies to determine the services that should be applied to the communication. Scheduler module 330 may determine an order that the services should be applied to the communication based on the information from the selected policies. Scheduler module 330 may be configured to access information in policy enforcement service database 320 when determining which policy enforcement service to invoke with respect to the communication and in what order each policy enforcement service should be invoked. For example, scheduler module 330 may determine that certain services should be applied to a message received at interface 350 but that the services need to occur in a particular order because one policy enforcement service may apply a service to both the message and the results of applying another service to the message. Using the information in policy enforcement service database 320, scheduler module 330 may identify appropriate policy enforcement services that may perform the services it has determined according to the policies in policies database 310 and cause requests to be sent to the determined policy enforcement service through interface 350.

In some embodiments, assembly module 340 may be configured to gather responses from policy enforcement services to requests sent by scheduler module 330. Assembly module 340 may receive responses from interface 350 and apply them to the message undergoing analysis to form a package. For example, the responses received by assembly module 340 may be tokens that include assertions that have been encrypted or digitally signed (and, in some cases, hashed) from various policy enforcement services. Assembly module 340 may use the information in either or both of policies database 310 and policy enforcement service database 320 to form the packages. For example, assembly module 340 may determine from the information in databases 310 and/or 320 that the responses from the policy enforcement service should be applied to the message undergoing analysis in a particular order. Assembly module 340 may then package the responses to the message in accordance with the determined order. In some embodiments, assembly module 340 may determine the order in which to package the responses with the message from scheduler module 330. After all the policy enforcement services respond to the requests sent by scheduler module 330, assembly module 340 may form the package and send it to another node for verification through interface 350. For example, assembly module 340 may send the package to guard 110 of FIG. 1.

In some embodiments, interface 350 may be a network interface configured to receive and send messages as described above with respect to scheduler module 330 and assembly module 340. Interface 350 may be configured to communicate using one or more networking protocols, such as Internet or Web protocols. For example, interface 350 may communicate using Web services, SOAP, SOAP with attachments, RPC, WS-Addressing, encryption protocols (such as XML encryption, TLS, and/or SSL), JMS, XML-formatted messages or documents, AJAX, and other suitable protocols.

Figure 4:
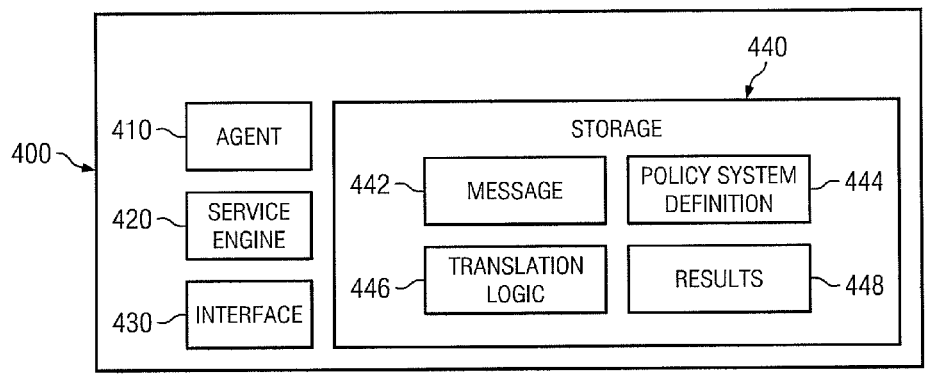
FIG. 4 is a block diagram illustrating one embodiment of policy enforcement service.

FIG. 4 is a block diagram illustrating one embodiment of policy enforcement service 400. In some embodiments, some or all of the components of policy enforcement service 400 may be used to implement policy enforcement services 170, 172, 174, 176, 178, 180, 182, and 184 of FIG. 1. Policy enforcement service 400 may include agent 410, service engine 420, interface 430, and storage 440. Storage 440 may include message 442, policy system definition 444, translation logic 446, and results 448. Each of blocks 410, 420, 430, 440, 442, 444, 446, and 448 may reside on the same or different hardware. Each of blocks 410, 420, 430, 440, 442, 444, 446, and 448 may be implemented using any suitable combination of hardware, firmware, and software. In some embodiments, policy enforcement service 400 may receive a request to apply one or more services to message 442 from a policy subsystem (such as policy subsystem 150 of FIG. 1), provide message 442 to service engine 420, and receive results 448 from service engine 420. Policy enforcement service 400 may develop representative assertions using policy system definition 444 and translation logic 446 from results 448. Policy enforcement service 400 may send the determined assertions through interface 430 to the requesting policy subsystem.

In some embodiments, agent 410 may be implemented as one or more Java programs or objects. Agent 410 may be implemented in computer languages that operate at the network level as well. Agent 410 may be configured to interface with a policy subsystem (such as policy subsystem 150 of FIG. 1). In some embodiments, agent 410 may be configured to communicate with a policy subsystem in one format and to communicate with service engines 420 in another format. Agent 410 may be configured to provide information regarding the polices enforced by service engine 420. For example, agent 410 may be configured to indicate whether a particular policy is implemented and to return all available policies. This may be provided in the following format, which is provided for example purposes only:

<env:Envelope>
    <env:Header>
    </env:Header>
    <env:Body wsu:Id="id-body">
        <pes:getPoliciesResponse>
            <pes:policy>
                <pes:name>TransformA</pes:name>
                <pes:version>1.0</pes:version>
            </pes:policy>
            <pes:policy>
                <pes:name>TransformA</pes:name>
                <pes:version>2.0</pes:version>
            </pes:policy>
            <pes:policy>
                <pes:name>TransformB</pes:name>
                <pes:version>1.1</pes:version>
            </pes:policy>
        </pes:getPoliciesResponse>
    </env:Body>
    </env:Envelope>

This format may also be used by agent 410 when reporting other information, such as availability of a policy service, system status (such as CPU, disk, memory utilization), available queue capacity, and current queue size.

In some embodiments, service engine 420 may be configured to apply one or more policy services. Example policy services include malware detection, keyword scanning, scanning for sensitive or confidential information, analysis of the source or destination of the communication, determination of whether the communication conforms to one or more government security protocols, and application of network enterprise services or protocols. Service engine 420, in some embodiments, may be a stand-alone device and/or software that may be accessible to a policy subsystem (such as policy subsystem 150 of FIG. 1) using agent 410. Service engine 420 may reside on separate hardware than agent 410 and may communicate with agent 410 over a network. For example, service engine 420 may be implemented as one of the external services 192 of FIG. 1. Service engine 420 may be implemented as a service that communicates using Web services. Service engine 420 may communicate synchronously or asynchronously with agent 410. For example, in asynchronous communication, agent 410 may provide a callback address (e.g., a Uniform Resource Locator (URL), an Internet Protocol (IP) address, and/or a port number) that service engine 420 may use to communicate results 448 after processing message 442. In asynchronous communication, for example, agent 410 may provide a unique identifier that service engine 420 may use to communicate results 448 after processing message 442. Service engine 420, in some embodiments, may receive and send messages in a manner that is particular to service engine 420. For example, service engine 420 may not be configured to communicate directly with a policy subsystem (such as policy subsystem 150 of FIG. 1). Agent 410 may be configured to communicate with service engine 420 and also configured to communicate with a policy subsystem, thereby allowing service engine 420 and a policy subsystem to communicate. In some embodiments, this may be advantageous because a system such as system 100 of FIG. 1 may be able to use a variety of existing service engines to analyze communication without having to reconfigure components such as policy subsystem 150 and guard 110 of FIG. 1.

In some embodiments, storage 440 may include a software storage application (such as a database) and/or computer-readable storage media such as, but not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, flash disks, solid state storage devices, and other suitable computer-readable storage media. Storage 440 may also be implemented using network attached storage (NAS) or a storage area network (SAN).

In some embodiments, policy system definition 444 may include information regarding the format and content of assertions used by a policy subsystem (such as policy subsystem 150 of FIG. 1). Policy system definition 444 may also include information regarding the protocol(s) used to communicate with the policy subsystem. In some embodiments, translation logic 446 may include logic, code, table(s), and/or database(s) used to determine messages to be communicated from agent 410 to a policy subsystem and/or service engine 420.

For example, agent 410 may receive a request to apply a service provided by service engine 420 and use policy system definition 444 to analyze the request. Agent 410 may then use translation logic 446 to determine one or more messages to send to service engine 420 in response to the received request because service engine 420 may not be capable of processing requests directly from a policy subsystem (such as policy subsystem 150 of FIG. 1). Agent 410 may also receive results 448 from service engine 420 and use translation logic 446 and/or policy system definition 444 to determine one or more assertions to send to the requesting policy subsystem that represent results 448.

Figure 5:
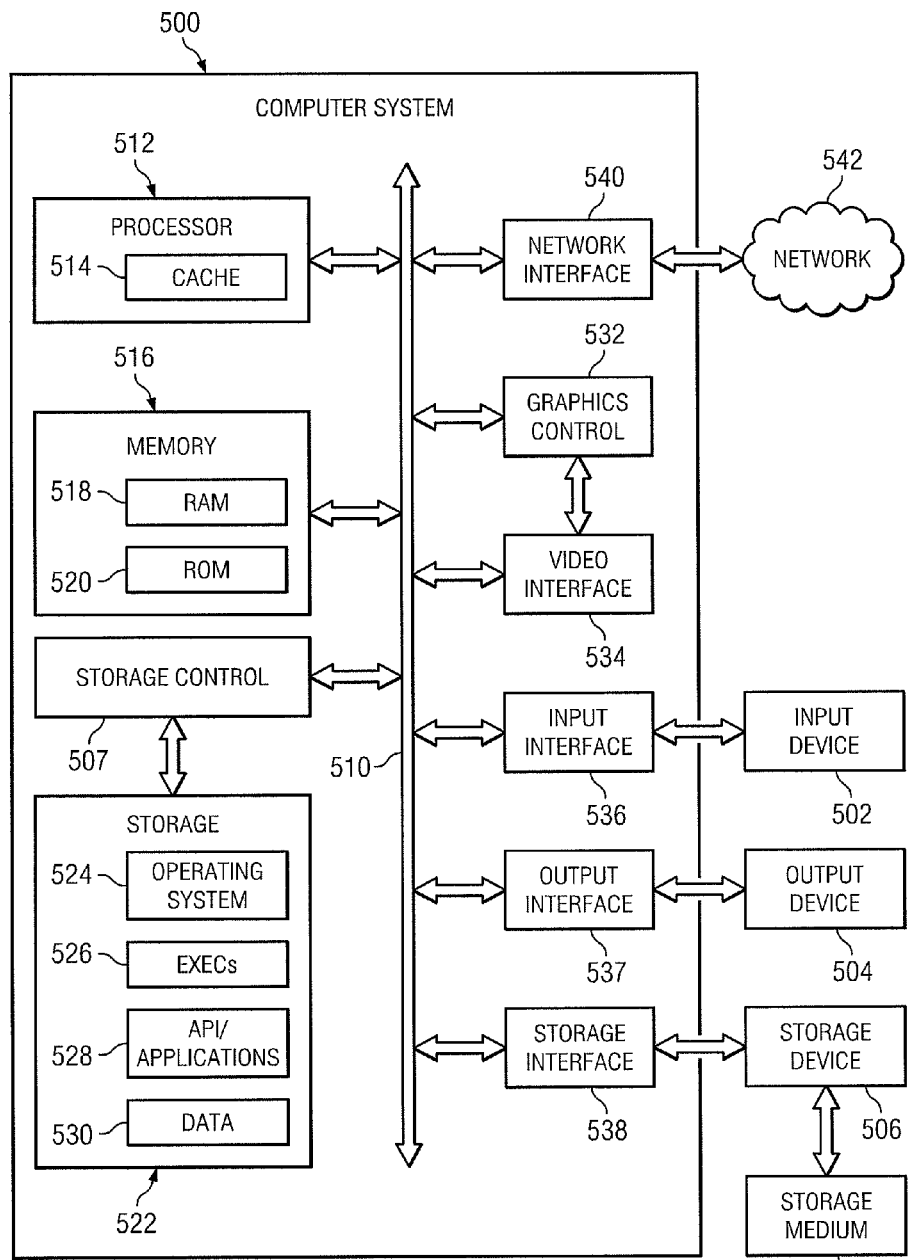
FIG. 5 illustrates an example computer system suitable for implementing one or more portions of particular embodiments.

FIG. 5 illustrates an example computer system 500 suitable for implementing one or more portions of particular embodiments. Although the present disclosure describes and illustrates a particular computer system 500 having particular components in a particular configuration, the present disclosure contemplates any suitable computer system having any suitable components in any suitable configuration. Moreover, computer system 500 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. One or more components of FIGS. 1-4 may be implemented using all of the components, or any appropriate combination of the components, of computer system 500 described below.

Computer system 500 may have one or more input devices 502 (which may include a keypad, keyboard, mouse, stylus, or other input devices), one or more output devices 504 (which may include one or more displays, one or more speakers, one or more printers, or other output devices), one or more storage devices 506, and one or more storage medium 508. An input device 502 may be external or internal to computer system 500. An output device 504 may be external or internal to computer system 500. A storage device 506 may be external or internal to computer system 500. A storage medium 508 may be external or internal to computer system 500.

System bus 510 couples subsystems of computer system 500 to each other. Herein, reference to a bus encompasses one or more digital signal lines serving a common function. The present disclosure contemplates any suitable system bus 510 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 500 includes one or more processors 512 (or central processing units (CPUs)). A processor 512 may contain a cache 514 for temporary local storage of instructions, data, or computer addresses. Processors 512 are coupled to one or more storage devices, including memory 516. Memory 516 may include random access memory (RAM) 518 and read-only memory (ROM) 520. Data and instructions may transfer bidirectionally between processors 512 and RAM 518. Data and instructions may transfer unidirectionally to processors 512 from ROM 520. RAM 518 and ROM 520 may include any suitable computer-readable storage media.

Computer system 500 includes fixed storage 522 coupled bi-directionally to processors 512. Fixed storage 522 may be coupled to processors 512 via storage control unit 507. Fixed storage 522 may provide additional data storage capacity and may include any suitable computer-readable storage media. Fixed storage 522 may store an operating system (OS) 524, one or more executables (EXECs) 526, one or more applications or programs 528, data 530 and the like. Fixed storage 522 is typically a secondary storage medium (such as a hard disk) that is slower than primary storage. In appropriate cases, the information stored by fixed storage 522 may be incorporated as virtual memory into memory 516. In some embodiments, fixed storage 522 may include network resources, such as one or more storage area networks (SAN) or network-attached storage (NAS).

Processors 512 may be coupled to a variety of interfaces, such as, for example, graphics control 532, video interface 534, input interface 536, output interface 537, and storage interface 538, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 540 may couple processors 512 to another computer system or to network 542. Network interface 540 may include wired, wireless, or any combination of wired and wireless components. Such components may include wired network cards, wireless network cards, radios, antennas, cables, or any other appropriate components. With network interface 540, processors 512 may receive or send information from or to network 542 in the course of performing steps of particular embodiments. Particular embodiments may execute solely on processors 512. Particular embodiments may execute on processors 512 and on one or more remote processors operating together.

In a network environment, where computer system 500 is connected to network 542, computer system 500 may communicate with other devices connected to network 542. Computer system 500 may communicate with network 542 via network interface 540. For example, computer system 500 may receive information (such as a request or a response from another device) from network 542 in the form of one or more incoming packets at network interface 540 and memory 516 may store the incoming packets for subsequent processing. Computer system 500 may send information (such as a request or a response to another device) to network 542 in the form of one or more outgoing packets from network interface 540, which memory 516 may store prior to being sent. Processors 512 may access an incoming or outgoing packet in memory 516 to process it, according to particular needs.

Particular embodiments involve one or more computer-storage products that include one or more tangible, computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 516 may include one or more tangible, non-transitory, computer-readable storage media embodying software and computer system 500 may provide particular functionality described or illustrated herein as a result of processors 512 executing the software. Memory 516 may store and processors 512 may execute the software. Memory 516 may read the software from the computer-readable storage media in mass storage device 516 embodying the software or from one or more other sources via network interface 540. When executing the software, processors 512 may perform one or more steps of one or more processes described or illustrated herein, which may include defining one or more data structures for storage in memory 516 and modifying one or more of the data structures as directed by one or more portions the software, according to particular needs. In some embodiments, some or all components of guard 110, policy subsystems 150 and 160, policy enforcement services 170, 172, 174, 176, 180, 182, and 184 of FIG. 1, analysis modules 230 and 232 of FIG. 2, scheduler module 330 and assembly module 340 of FIG. 3, agent 410 and service engine 420 of FIG. 4 may be implemented using configurations such as the description of memory 516 above.

In some embodiments, the described processing and memory elements (such as processors 512 and memory 516) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, computer system 500 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

FIGS. 6-9 are flowcharts that illustrate various embodiments of the operation of a network validation system, such as system 100 of FIG. 1. In general, the steps illustrated in FIGS. 6-9 may be combined, modified, or deleted where appropriate, and additional steps may also be added to the example operation. Furthermore, the described steps may be performed in any suitable order. In some embodiments, the steps described below may be performed by any suitable combination of the elements discussed above with respect to FIGS. 1-5.

Figure 6:
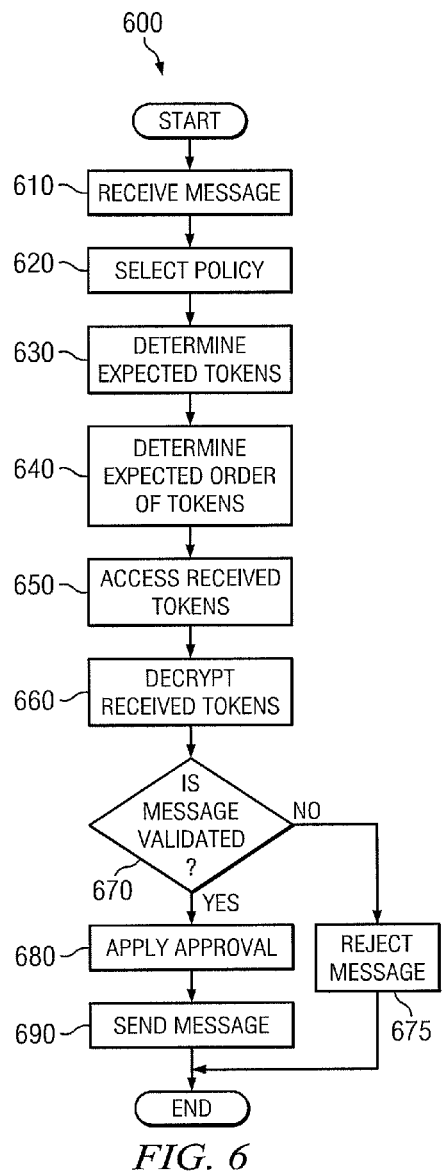
FIG. 6 is a flowchart illustrating one embodiment of how a message may be analyzed at a cross-domain network security element.

FIG. 6 is a flowchart illustrating one embodiment of how a message may be analyzed at a cross-domain network security element, such as a guard. The flowchart illustrates how to determine whether the message has been validated by multiple services.

At step 610, in some embodiments, a guard (such as guard 110 of FIG. 1) may receive a message from one network that is destined for another network to which the guard is also coupled. For example, the guard may be coupled to two different network enclaves (such as enclaves 102 and 104 of FIG. 1). The message received at step 610 may be included in a package that also includes other items, such as tokens, as discussed further below. The package may be encrypted and include the message and the tokens. In some embodiments, the tokens sent to the guard may include a cryptographic hash of the message (i.e., using SHA-256 or MD5). The tokens received by the guard may include the cryptographic hash of the message and may be signed.

At step 620, in some embodiments, the guard may select one or more policies to apply to the message received at step 610. This step may be implemented using policies databases 210 and/or 212 as well as analysis modules 230 and 232 of FIG. 2. The guard may choose the one or more policies based on one or more factors of the message. Such factors may include, for example, the type of message, the originator of the message, the destination of the message, the payload of the message, the security levels of the networks coupled to the guard, data markings, and the content of the message (such as the text of the message or the contents of an attachment). The guard may select one or more configuration files in addition to or instead of one or more polices at step 610.

At step 630, in some embodiments, the guard may use the one or more policies selected at step 620 to determine what tokens are expected to be with or in the message. At step 640, in some embodiments, the guard may determine if the tokens with or in the message are in the correct order using the one or more policies selected at step 620. The tokens may be hashed and/or digitally signed or encrypted assertions by a policy enforcement service (such as policy enforcement services 170, 172, 174, 176, 178, 180, 182, and 184 of FIG. 1) indicating that a policy service was performed and what the results were of applying the policy service to the message. One or more policies may specify what services should have been applied to a message and what order the services should be applied in. The policies may also specify which node should apply each service.

At step 650, in some embodiments, the guard may access one or more tokens received with the message at step 610. Tokens may be appended to a message, embedded as part of a message, or placed in a package along with a message. At step 660, in some embodiments, the tokens may be decrypted. For example, the nodes providing the policy enforcement services may use a public key/private key form of encryption when encrypting the assertion(s) (or hashed assertion(s)). The guard may use the public keys of the policy enforcement services to decrypt the tokens. The public keys may be specified in the one or more policies selected at step 620. The public keys may also be available in a database accessible to the guard, such as policy enforcement services databases 220 and 222 of FIG. 2. Other suitable methods of securing communication may be used in addition to or as an alternative to public key/private key encryption.

At step 670, in some embodiments, the guard may determine whether the message is appropriately validated. Components such as analysis modules 230 and 232 as well as policy enforcement services databases 220 and 222 of FIG. 2 may be used at this step. The guard may validate metadata and compare it against the schema. The guard may perform HTTP header validations. The guard may determine whether the expected tokens determined at step 630 are present in the message received at step 610. For example, the decrypted tokens from step 660 may consist of assertions that have been hashed by multiple policy enforcement services.

Such assertions may include a Security Assertion Markup Language (SAML) assertion representing the results of applying a service to the message. A policy enforcement service may generate a hash of the assertion by using a suitable hashing algorithm like the Secure Hash Algorithm (SHA) (e.g., SHA-256 and SHA-512). The guard may compare these hashes of assertions to the expected tokens determined at step 630 to determine whether all of the expected tokens are present as well as whether the appropriate services have been performed. The guard may also determine whether the appropriate policy enforcement service nodes generated the tokens. The guard may also determine whether the policy enforcement services were applied in the appropriate order. For example, the assertions may include an input hash and an output hash indicating what the policy enforcement service received and what it outputted. This may be used to form a hash chain by the guard. The hash chain may be used to verify that no "man-in-the-middle" or other attacks have occurred. The guard may analyze these and other suitable parameters to determine whether the services have been applied to the message in the appropriate order. For example, the guard may verify that the output hash of an assertion is equal to the input hash of the next assertion. The guard may also validate the timestamps of the assertions. In some embodiments, if the guard determines that the message has been validated, the procedure may proceed to step 680. The guard may determine whether the message is properly validated by determining whether the appropriate tokens are present, whether the appropriate nodes generated the tokens, and/or by determining that the services applied to the message were done so in the appropriate order. If the guard determines that the message is not appropriately validated, then the guard may proceed to step 675.

At step 675, in some embodiments, the guard may reject the message. The guard may merely refuse to allow the message to continue onto its destination. The guard may send an indication that it has not allowed the message to continue to its destination. The guard may send an alert based on the reasons why the message was not validated. For example, if the message was not validated because malware was detected in the message or because confidential information was detected in the message, the guard may send an alert which may trigger other remedial measures.

At step 680, in some embodiments, the guard may apply or add an approval to the message. The approval may be an indication that the guard has validated the message. The approval may include a SAML assertion. The SAML assertion may be hashed and/or encrypted. For example, the guard may use a 2048-bit key when signing the assertion. The guard may compute one or more hashes, such as hashes of the output payload, the timestamp, and the message ID.

At step 690, in some embodiments, the guard may send the message to its destination. For example, the guard may allow the message to enter a network or a portion of a network (such as an enclave) that is different from the network or portion of a network from which the message was received. For example, the guard may allow the message to enter a network or a portion of a network that is at a higher or lower security level than the network or portion of a network from which the message was received.

In some embodiments, the steps of FIG. 6 as well as the components of FIG. 4 may provide certain advantages. For example, the cost of modifying and enhancing guards or other cross-domain security devices may be reduced and the time to implement such changes may be reduced. As another example, functions of a guard may be distributed across multiple devices or services. As another example, the functions performed by the guard may be provided in a modular format.

Figure 7:
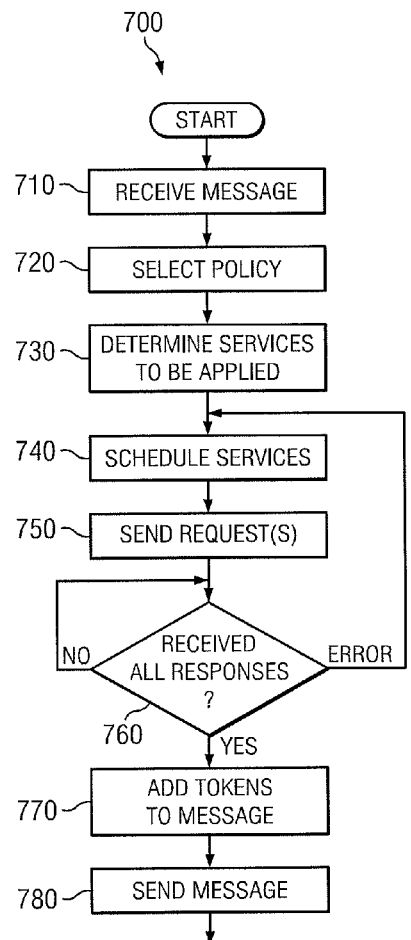
FIG. 7 is a flowchart illustrating one embodiment of how multiple policy services may be applied to an incoming message destined for a different network or portion of a network.

FIG. 7 is a flowchart illustrating one embodiment of how multiple policy services may be applied to an incoming message destined for a different network or portion of a network (such as a different enclave with a different security level). The flowchart illustrates how to determine which services should be applied to the message and how to manage the scheduling of such services.

At step 710, in some embodiments, a policy subsystem (such as policy subsystems 150 or 160 of FIG. 1 and/or policy subsystem 300 of FIG. 3) may receive a message. The message may be destined for a different network or portion of a network to which a guard (such as guard 110 of FIG. 1) is also coupled. For example, the message may be received at one network enclave but be destined for a different network enclave (such as enclaves 102 and 104 of FIG. 1). The message received at step 710 may include attachments, such as file attachments.

At step 720, in some embodiments, the policy subsystem may select one or more policies to apply to the message received at step 710. This step may be implemented using policies database 310 as well as scheduler module 330 of FIG. 3. The policy subsystem may choose the one or more policies based on one or more factors of the message. Such factors may include, for example, the type of message, the originator of the message, the destination of the message, the payload of the message, and the content of the message (such as the text of the message or the contents of an attachment).

At step 730, in some embodiments, the policy subsystem may use the one or more policies selected at step 720 to determine what services should be applied to the message. This step may be implemented using scheduler module 330 of FIG. 3. One or more policies may specify what services should be applied to a message and what order the services should be applied in. The policies may also specify which node should apply each service.

At step 740, in some embodiments, the policy subsystem may schedule the services determined at step 730 amongst one or more nodes that implement policy enforcement services. This step may be implemented using policy enforcement service database 320 and scheduler module 330 of FIG. 3. The policy subsystem may identify nodes (such as policy enforcement services 170, 172, 174, 176, 178, 180, 182, and 184 of FIG. 1) that implement the services determined at step 730. The policy subsystem may determine what order the services should be applied in according to the policies selected at step 740. For example, the policy subsystem may determine that one service needs the results of another service in order to complete its operations. In such situations, policy subsystem may schedule the application of the services to comply with these requirements. Where the services to be applied to the message determined at step 730 involve more than one policy enforcement service node, the policy subsystem may schedule multiple services to be applied to the message at the same time.

At step 750, in some embodiments, the policy subsystem may send requests to policy enforcement service nodes to apply the services determined at step 730 in accordance with the schedule determined at step 740. This step may be implemented using policy enforcement service database 320, scheduler module 330, and interface 350 of FIG. 3. The policy subsystem may identify nodes that implement the services determined at step 730. The policy subsystem may communicate the requests using Web services protocols, such as SOAP, SOAP with attachments, RPC, WS-Addressing, encryption protocols (such as XML encryption, TLS, and/or SSL), JMS, XML-formatted messages or documents, AJAX, and other suitable protocols. In some embodiments, the policy subsystem may communicate to all of the policy enforcement service nodes using the same set of protocols. The policy subsystem may wait for one or more responses from policy enforcement service nodes before sending a request to apply certain services, as discussed above with respect to step 740.

At step 760, in some embodiments, the policy subsystem may receive responses from the policy enforcement services and determine whether all of the requests sent at step 750 have been responded to. This step may be implemented using scheduler module 330 and interface 350 of FIG. 3. The policy subsystem may use timeouts or check for errors with respect to the policy enforcement service nodes at step 760. If a timeout or error event is detected, policy subsystem may return to step 740 and reschedule the service which failed to be performed. If all of the responses have not been received, policy subsystem may return to step 760 at a later time to reevaluate whether all of the responses have been received. If all of the responses have been received, the policy subsystem may proceed to step 770. The policy subsystem may also determine that a response needed to trigger the sending of a pending request has been received and may send that request. The responses received at step 760 may include tokens. Examples of such tokens include assertions (such as SAML assertions), hashed assertions, encrypted or digitally signed assertions, messages, flags, parameters, indicators, or other suitable techniques or structures for indicating the result of applying a policy service. For example, the responses received at this step may consist of SAML assertions (or a hash and/or digitally signed or encrypted SAML assertions) placed within SOAP message security headers.

In some embodiments, each of the policy enforcement services may include a hash of the incoming body content of the request and a hash of the resulting body content after the service has been applied in the responses received at step 760. In some embodiments, this may be used to form a hash chain by the policy subsystem when such hashes are included in assertions of some or all of the policy enforcement services. The hash chain may be used to verify that no "man-in-the-middle" or other attacks have occurred. At step 760, the policy subsystem may determine that the hash chain is malformed or broken and determine that an error has occurred. In some embodiments, the policy subsystem may not perform analysis on the hash chain; instead, the guard may perform analysis on the hash chain. As depicted in FIG. 7, the policy subsystem may return to step 740 and reschedule services for the message received at step 710. The policy subsystem may also be configured to reject the message if it determines an error has occurred because of a broken hash chain.

At step 770, in some embodiments, the policy subsystem may add tokens received from policy enforcement services to the message received at step 710. This step may be implemented using assembly module 340 of FIG. 3. The tokens may be hashed and/or digitally signed or encrypted assertions by a policy enforcement service indicating that a policy service was performed and what the results were of applying the policy service to the message. Such assertions may include a SAML assertion representing the results of applying a service to the message. A policy enforcement service may generate a hash assertion by using a suitable hashing algorithm like the SHA (e.g., SHA-256 and SHA-512). The policy subsystem may create a package that includes the tokens and the message. For example, the policy subsystem may create a communication which includes the tokens and the message. The policy subsystem may add the tokens to the message (e.g., to the beginning of the message or the end of the message). The policy subsystem may embed the tokens in the message. The policy subsystem may wrap the message with the tokens.

At step 780, in some embodiments, the policy subsystem may send the message with the tokens to a guard or other network node that will validate the message. This step may be implemented using assembly module 340 and/or interface 350 of FIG. 3. The policy subsystem may communicate the message and the tokens using Web services protocols, such as SOAP, SOAP with attachments, RPC, WS-Addressing, encryption protocols (such as XML encryption, TLS, and/or SSL), JMS, XML-formatted messages or documents, AJAX, and other suitable protocols.

Figure 8:
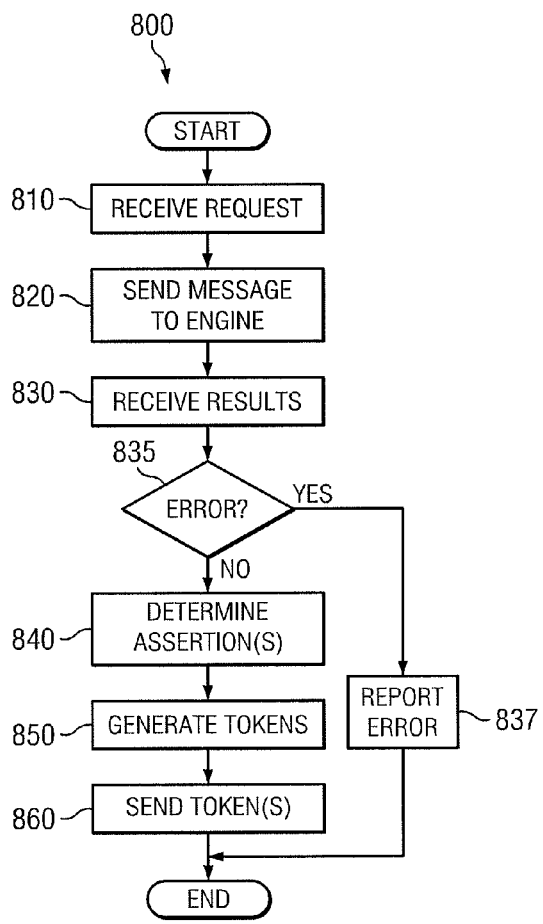
FIG. 8 is a flowchart illustrating one embodiment of how policy services are applied to a message destined for a different network or portion of a network.

The following is an example of a SOAP message that may be sent at step 780:
SOAP Header:
WS-Addressing MessageID
WS-Security Header
  SAML Assertion
    Signature
  SAML Assertion
    Signature
  Timestamp
SOAP Body:
Payload FIG. 8 is a flowchart illustrating one embodiment of how policy services are applied to a message destined for a different network or portion of a network (such as a different enclave with a different security level). The flowchart illustrates how a policy enforcement service applies a service and returns results of the service.

At step 810, in some embodiments, a policy enforcement service (such as policy enforcement services 170, 172, 174, 176, 178, 180, 182, and 184 of FIG. 1) may receive a request from a policy subsystem (such as policy subsystem 150 or 160) to apply a service to a message. This step may be implemented using policy enforcement service 400 of FIG. 4. The policy subsystem may communicate the requests using Web services protocols, such as SOAP, SOAP with attachments, RPC, WS-Addressing, encryption protocols (such as XML encryption, TLS, and/or SSL), JMS, XML-formatted messages or documents, AJAX, and other suitable protocols. The request may include the message and/or attachments to the message. The request may specify parameters that specify how the service should be applied. The requested service may be a service provided by a service engine coupled to the policy enforcement service, such as service engine 420 of FIG. 4. The message may be received by an agent on the policy enforcement service, such as agent 410 of FIG. 4.

For example, the policy enforcement service may receive a SOAP message at step 810 that specifies the policy to be enforced and the content on which the policy should be enforced. This may be structured as provided by the following example:
SOAP Header:
WS-Addressing MessageID
WS-Security Header
  Timestamp
SOAP Body:
Policy
  Name
  Version
Content
  Payload The request received at step 810, for example, may be implemented as:

```
<env:Envelope>
  <env:Header>
    <wsa:MessageID wsu:Id="id-messageId"/>
  </env:Header>
  <env:Body wsu:Id="id-body">
    <pes:enforcePolicy>
      <pes:policy>
        <pes:name>TransformA</pes:name>
        <pes:version>1.0</pes:version>
```

```
    </pes:policy>
    <pes:content>
        .  (data payload)
        .
    </pes:content>
    <pes:enforcePolicy>
  </env:Body>
</env:Envelope>
```

At step 820, in some embodiments, the policy enforcement service may provide the message (and any attachments) to the service engine. This step may be implemented using agent 410, service engine 420, policy system definition 444, and/or translation logic 446 of FIG. 4. The service engine coupled to the policy enforcement service may be unable to process communication received from the policy subsystem due to the format of the communication sent by the policy subsystem. In some embodiments, an agent on the policy enforcement service may receive the request sent at step 810 and determine that a request for the application of a policy service was sent by the policy subsystem. The agent may be configured to provide the message (and any attachments) to the service engine in a format that the service engine is able to process. The agent may send instructions to the service engine in a format that the service engine can process including one or more parameters that may have been specified in the request received at step 810. These instructions may be in a format different than the request received at step 810 sent by the policy subsystem.

For example, the service engine coupled to the policy enforcement service may be invoked using a command-line interface. The agent of the policy service engine may create and issue a command invoking the service engine by analyzing and mapping the contents of the request received at step 810. As another example, the service engine may utilize a graphical interface. The agent may automatically launch and manipulate the service engine using simulated mouse clicks or keystrokes based on the contents of the request received at step 810. As another example, the service engine may be configured to automatically apply services to files present in one or more directories. The agent may be configured to place the message (and any attachments) in the one or more directories used by the service engine. As another example, the agent may communicate the message (and any attachments) to the service engine using Web services protocol, such as SOAP, SOAP with attachments, RPC, WS-Addressing, encryption protocols (such as XML encryption, TLS, and/or SSL), JMS, XML-formatted messages or documents, AJAX, and other suitable protocols. The agent may be configured to communicate with the service engine synchronously or asynchronously. As an example, the agent may provide a callback address (e.g., a Uniform Resource Locator (URL), an Internet Protocol (IP) address, and/or a port number) that the service engine may use to communicate results after applying the service to the message (and any attachments).

As an example, a malware detection service such as RAYTHEON'S RSHIELD service may be used as a service engine. The agent may invoke the service by providing it with information such as the RSHIELD endpoint, an identity of the agent, key information, or other suitable data. The RAYTHEON RSHIELD service may also be provided a callback URL by the agent.

At step 830, in some embodiments, the policy enforcement service may receive result(s) from the policy service agent. This step may be implemented using agent 410 and service engine 420 of FIG. 4. The result(s) may be in a format that the policy subsystem may not be configured to process. The agent may receive the results from the service engine. The results may be received in a variety of manners, in various embodiments. For example, the results may be received via a command-line output, using one or more output files, generating one or more images or data displayed on a graphical user interface, or using a callback address.

At step 835, in some embodiments, the agent may determine whether the results received at step 830 indicate that there was an error in applying the service. This may done by analyzing the output of the service engine, such as if error codes, messages, exceptions, or flags are communicated. If an error is detected, the error may be reported at step 837. An error may be reported using, for example, a SOAP Fault message. The report may contain an error code, a readable description, and other data that can be used to trace the error. If there is not an error, then step 840 may be performed. For example, error codes 500-599 may indicate that there was internal error and processing was aborted.

In some embodiments, an error may be reported if it is determined that the message received at step 810 with the request does not conform to the policy. For example, a SOAP Fault message may be sent at step 837 in such situations. Error codes 400-499 may be used to indicate such situations in the SOAP Fault message.

The following is an example of what may be included in the message sent at step 837:

```
<env:Envelope>
  <env:Header>
    <wsa:MessageID wsu:Id="id-messageId"/>
    .
    .
  </env:Header>
  <env:Body wsu:Id="id-body">
      <env:Fault>
          <env:Code>
              <env:Value>env:Client</env:Value>
              <env:SubCode>400</env:SubCode>
      </env:Code>
      <env:Reason>
        <env:Text xml:lang="en-US">Could not load
        XSLT</env:Text>
      </env:Reason>
      <env:Detail>
        <pes:errorDetail>
          TransformA could not enforce its policy on the payload data.
          The required XSLT could not be retrieved.
        </pes:errorDetail>
        <pes:enforcePolicyResponse>
          <pes:policy>
              <pes:name>TransformA</pes:name>
              <pes:version>1.0</pes:version>
          </pes:policy>
          <pes:responseData>
              <pes:enforcementStatus> </pes:enforcementStatus>
          </pes:responseData>
          <pes:content>
            .
            . (optional failed payload)
            .
          </pes:content>
        </pes:enforcePolicyResponse>
      </env:Detail>
    </env:Fault>
  </env:Body>
</env:Envelope>
```

At step 840, in some embodiments, the agent may determine one or more assertions from the results received from the service engine at step 830. This step may be implemented using agent 410, policy system definition 444, and/or translation logic 446 of FIG. 4. The assertions may be in a format that the policy subsystem is configured to process. The assertions may be used by various policy enforcement services that have different service engines when communicating the results of applying various services to the policy subsystem. Such assertions may include a SAML assertion representing the results of applying a service to the message. The assertion(s) generated at this step may also include a hash of the incoming body content of the request and a hash of the resulting body content after the service has been applied. In some embodiments, this may be used to form a hash chain by the policy subsystem when such hashes are included in assertions of some or all of the policy enforcement services. The hash chain may be used to verify that no "man-in-the-middle" or other attacks have occurred.

For example, if the policy enforcement service was invoking a remote service engine that is a WiSARD Web service, the policy enforcement service may receive an indication that the message is releasable. A SAML assertion may be generated that indicates a successful policy enforcement activity. If the policy enforcement service receives a result that indicates the message is not releasable, then a SAML assertion may be generated indicating that the policy was not enforced. In some embodiments, if it is determined that the policy was not followed (i.e., a file is not releasable), an assertion may not be returned and instead an error message as discussed at step 837 may be returned. The assertion may include the following information:

Name—Identifies this policy enforcement service implementation

Version—Identifies this policy enforcement service version

Input Hash—Integrity verification of input data payload

Message ID—Identifies this message

Output Hash—Integrity verification of output data payload

Receive Date/Time—Time when request was received by the policy enforcement service Start Date/Time—Time when processing started End Date/Time—Time when all processing completed Enforcement Status—Describes the result of the policy enforcement The following are example SAML assertions that may be used:

Example 1

<saml:Attribute AttributeName="policyResult"
AttributeNamespace="urn:oasis:names:tc:SAML:1.0:attribute"> <saml:AttributeValue>POLICY_ ENFORCED_NO_CHANGES</saml:AttributeValue>
</saml:Attribute>

Example 2

<saml:Attribute AttributeName="policyName"
AttributeNamespace="urn:oasis:names:tc:SAML:1.0:attribute"> <saml:AttributeValue>determineReleasability</saml:AttributeValue> </saml:Attribute>

As another example, if the policy enforcement service was invoking a remote service engine that is a malware detection service (such as RAYTHEON'S RSHIELD service), the policy enforcement service may receive an indication that the message is not malware. A SAML assertion may be generated that indicates a successful policy enforcement activity. If the policy enforcement service receives a result that indicates the message is malware or suspected malware, then a SAML assertion may be generated indicating that the policy was not enforced. In some embodiments, if it is determined that the message is malware or suspected malware, an assertion may not be generated and instead an error message as discussed at step 837 may be returned. Hash values of the input to and the output from the malware detection service may be used to ensure integrity. The following are merely example SAML assertions that may be used:

<Assertion xmlns="urn:oasis:names:tc:SAML:1.0:assertion"
xmlns:saml="urn:oasis:names:tc:SAML:1.0:assertion"
xmlns:samlp="urn:oasis:names:tc:SAML:1.0:protocol"
xmlns:xsd="http://www.w3.org/2001/XMLSchema"
xmlns:xsi="http://www.w3.org/2001/XMLSchema-instance"
AssertionID="_1cc53ed2c96528331861bc1d$_3$d0ecbfe"
IssueInstant="2010-02-18T01:39:27.417Z"
Issuer="RShieldPes" Major Version="1" MinorVersion="1">
<Attribute xmlns:xsd="http://www.w3.org/2001/XMLSchema"
xmlns:xsi="http://www.w3.org/2001/XMLSchema-instance"
AttributeName="outputAttachmentHash1"
AttributeNamespace="urn:oasis:names:tc:SAML:1.0:attribute">
<AttributeValue>WQzeB+nbFLwoQbw9cHDeIiYj7ek=</AttributeValue>
</Attribute>
<Attribute xmlns:xsd="http://www.w3.org/2001/XMLSchema"
xmlns:xsi="http://www.w3.org/2001/XMLSchema-instance"
AttributeName="inputAttachmentHash1"
AttributeNamespace="urn:oasis:names:tc:SAML:1.0:attribute">
<AttributeValue>WQzeB+nbFLwoQbw9cHDeIiYj7ek=</AttributeValue>
</Attribute>
<Attribute xmlns:xsd="http://www.w3.org/2001/XMLSchema"
xmlns:xsi="http://www.w3.org/2001/XMLSchema-instance"
AttributeName="policyResult"
AttributeNamespace="urn:oasis:names:tc:SAML:1.0:attribute">
<AttributeValue>POLICY_ENFORCED_ NO_CHANGES</AttributeValue>
</Attribute>

At step 850, in some embodiments, the policy enforcement service may generate one or more tokens based on the assertion(s) determined at step 840. This step may be performed using agent 410 of FIG. 4. For example, the policy enforcement service may generate a hash (or multiple hashes) of the assertion(s) by using a suitable hashing algorithm like the SHA (e.g., SHA-256 and SHA-512). The policy enforcement service may encrypt the assertion using a public key/private key form of encryption. The private key used by the policy enforcement service may be specific to that policy enforcement service and be different than private keys used by other policy enforcement services. For example, the policy enforcement service may use a 1024-bit key to sign the assertion. Other suitable encryption techniques may be employed by the policy enforcement service. The policy enforcement service may digitally sign the assertion(s) or a hash of the assertion(s).

At step 860, in some embodiments, the policy enforcement service may send the token(s) generated at step 850 to the policy subsystem. This step may be performed using agent 410 and/or interface 430 of FIG. 4. The policy enforcement service may communicate the token(s) using Web services protocol(s), such as SOAP, SOAP with attachments, RPC, WS-Addressing, encryption protocols (such as XML encryption, TLS, and/or SSL), JMS, XML-formatted messages or documents, AJAX, and other suitable protocols. In various embodiments, the communication occurring at step 860 may include one or more of the following: token(s), assertion(s) generated at step 840, results received at step 830 (such as log files, files representative of the analysis or results, or other output(s) from a service engine), a message received at step 810, and a modification of the message received at step 810 generated by the service engine. For example, if a SAML assertion was generated at step 840, the SAML assertion (or a hash and/or digitally signed or encrypted SAML assertion) may be placed within a SOAP message security header.

At step 860, for example, a SOAP message may be sent. Beyond the SOAP envelope, a SOAP header may include WS-Addressing headers. The SOAP header may include a Web Services WS-Security header. The WS-Security header may include a SAML assertion with the following attributes and values, which are provided for example purposes only:

pesIdentity=VirusScan
version=1.0
inputHash=e598d34s . . .
outputHash=a2385 . . .
messageID=id-abcd
receiveDateTime=nnn
startDateTime=nnn
endDateTime=nnn
enforcementStatus=successful
timestamp=2009-06-18T08:08:34.008

The WS-Security header may also include the public key of the policy enforcement service. The body portion of the SOAP message may include metadata from the policy enforcement service. The body portion of the SOAP message may also include the payload of a message (and, optionally, attachments to the message) embedded in the request received at step 810.

As another example, the following may be part of what is sent at step 860:

```
<env:Envelope>
 <env:Header>
  <wsa:MessageID wsu:Id="id-messageId"/>
  <saml:Assertion wsu:id="TransformA-SAML-ID">
   <wsse: Security>
    <saml:Assertion wsu:Id="TransformA-1.0-SAML">
    <saml:AuthenticationStatement/>
    <saml:AttributeStatement>
     <saml:Subject/>
     <saml:Attribute AttributeName="pesName">
      <saml:AttributeValue>
       TransformA
      </saml:AttributeValue>
     </saml:Attribute>
     <saml:Attribute AttributeName="pesVersion">
      <saml:AttributeValue>
       1.0
      </saml:AttributeValue>
     </saml:Attribute>
         <saml:Attribute AttributeName="messageID">
      <saml:AttributeValue>
       id-messageId
      </saml:AttributeValue>
     </saml:Attribute>
      <saml:Attribute AttributeName="pesInputHash">
      <saml:AttributeValue>
       ef54594afef245ba9d0e52bb
```

-continued

```
      </saml:AttributeValue>
     </saml:Attribute>
     <saml:Attribute AttributeName="pesOutputHash">
      <saml:AttributeValue>
       ef54594afef245ba9d0e52bb
      </saml:AttributeValue>
     </saml:Attribute>
      <saml:Attribute AttributeName="pesRecieveTime">
      <saml:AttributeValue>
       2009-10-10T12:55:23.345-05:00
      </saml:AttributeValue>
     </saml:Attribute>
     <saml:Attribute AttributeName="pesStartTime">
      <saml:AttributeValue>
       2009-10-10T12:55:23.346-05:00
      </saml:AttributeValue>
     </saml:Attribute>
      <saml:Attribute AttributeName="pesEndTime">
      <saml:AttributeValue>
       2009-10-10T12:55:24.678-05:00
      </saml:AttributeValue>
     </saml:Attribute>
     <saml:Attribute AttributeName="enforcementStatus">
      <saml:AttributeValue>
       success
      </saml:AttributeValue>
     </saml:Attribute>
    </saml:AttributeStatement>
    <ds:Signature>
     <ds:SignedInfo>
      <ds:Reference URI="#TransformA-1.0-SAML">
     </ds:SignedInfo>
     <ds:SignatureValue/>
     <ds:KeyInfo/>
    </ds:Signature>
       </saml:Assertion>
    </wsse:Security>
   </saml:Assertion>
 </env:Header>
 <env:Body wsu:Id="id-body">
   <pes:enforcePolicyResponse>
    <pes:policy>
     <pes:name>TransformA</pes:name>
     <pes:version>1.0</pes:version>
    </pes:policy>
    <pes:responseData>
     <pes:enforcementStatus>success</pes:enforcementStatus>
    </pes:responseData>
    <pes:content>
      .
      . (data payload, if transformed)
      .
    </pes:content>
   </pes:enforcePolicyResponse>
  </env:Body>
</env:Envelope>
```

Figure 9:
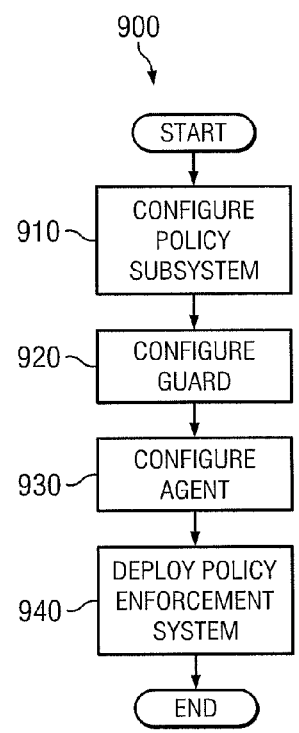
FIG. 9 is a flowchart illustrating one embodiment of how a policy enforcement service may be added to a validation system.

FIG. 9 is a flowchart illustrating one embodiment of how a policy enforcement service may be added to a validation system, such as system 100 of FIG. 1. The flowchart illustrates the steps that may be performed to adjust the validation system to incorporate a new or different policy enforcement service.

At step 910, in some embodiments, one or more policy subsystems (such as policy subsystem 150 and/or 160 of FIG. 1) may be modified. The policies stored at the policy subsystem (such as policies database 310 of FIG. 3) may be added to or modified such that they incorporate the service performed by the new or different policy enforcement service. For example, one or more policies may add the new service. The order in which services are requested may be changed in one or more policies. Services may be removed or replaced as a result of adding the new or different services in one or more policies. In some embodiments, information regarding the policy enforcement service node may be added to the policy subsystem. For example, a policy enforcement service database such as policy enforcement service database 320 of FIG. 3 may be modified. Such information regarding the policy enforcement service may include its: name, version, address, network information, signature, public key, private key, and hashing algorithm parameters.

At step 920, in some embodiments, a guard (such as guard 110 of FIG. 1) may be modified. The policies stored at the policy subsystem (such as policies databases 210 and/or 212 of FIG. 2) may be added to or modified such that they incorporate the service performed by the new or different policy enforcement service. For example, one or more policies may add the new service. The order in which services are requested may be changed in one or more policies. Services may be removed or replaced as a result of adding the new or different services in one or more policies. In some embodiments, information regarding the policy enforcement service node may be added to the guard. For example, one or more policy enforcement service databases such as policy enforcement service databases 220 and/or 222 of FIG. 2 may be modified. Such information regarding the policy enforcement service may include its: name, version, address, network information, signature (e.g., RSA-1024 signature), public key, private key, and hashing algorithm parameters.

At step 930, in some embodiments, an agent may be configured to interact with the service engine providing the service of the new or different policy enforcement service. For example, an agent such as agent 410 of FIG. 4 may be created to interact with a new or modified service engine such as service engine 420 of FIG. 4. This may include adding or modifying databases or storage structures such as policy system definition 444 and translation logic 446 of FIG. 4 such that the agent may be configured to receive requests for application of a service from a policy subsystem and invoke the service engine that will perform the service. Also, such modifications or additions may configure the agent to receive results of applying a service by the service engine and generate assertions or messages that use one or more protocols used by the policy subsystem to communicate the received results.

For example, the agent may be configured to receive a request using the following protocol. The request may contain both the specific policy to enforce, and the data payload to process. The policy may be specified by the following attributes:

| Policy Name | Describes the policy to be enforced |
|---|---|
| Policy Version | Describes which policy version to enforce |

Additional required data may be defined and contained in a requestData element. The data payload may be contained within a separate element, and is further identified using a unique message identifier. The following is an example request that the agent may be configured to receive:

```
<env:Envelope>
<env:Header>
<wsa:MessageID wsu:Id="id-messageId"/>
</env:Header>
<env:Body wsu:Id="id-body">
  <pes:enforcePolicy>
    <pes:policy>
      <pes:name>TransformA</pes:name>
      <pes:version>1.0</pes:version>
```

-continued

```
    </pes:policy>
    <pes:requestData>
    </pes:requestData>
    <pes:content>
        .
        .   (data payload)
        .
    </pes:content>
  <pes: enforcePolicy >
</env:Body>
</env:Envelope>
```

As an example, the agent may be configured to communicate results of applying a service to the policy subsystem using the following protocol. The data payload may be included in the response. If the policy entailed data transformation, the output data payload may be included. The response may specify the policy applied by the following attributes, which are provided as examples:

| Policy Name | Describes the policy to be enforced |
|---|---|
| Policy Version | Describes which policy version to enforce |

The response may include the enforcement status, describing the result of the policy enforcement. If any attachments were processed and modified, the updated reference to the modified attachment is added to the output data payload. The response may include a SAML Assertion, signed using a unique key. The following is an example response that the agent may be configured to send:

```
<env:Envelope>
<env:Header>
<wsa:MessageID wsu:Id="id-messageId"/>
<saml:Assertion wsu:id="TransformA-SAML-ID">
    .
    .
    .
</saml:Assertion>
</env:Header>
<env:Body wsu:Id="id-body">
    <pes:enforcePolicyResponse>
        <pes:policy>
            <pes:name>TransformA</pes:name>
            <pes:version>1.0</pes:version>
        </pes:policy>
        <pes:responseData>
<pes:enforcementStatus>
Success
</pes:enforcementStatus>
        </pes:responseData>
        <pes:content>
            .
            . (data payload, if transformed)
            .
        </pes:content>
    </pes:enforcePolicyResponse>
</env:Body>
</env:Envelope>
```

At step 940, in some embodiments, the policy enforcement service may be deployed. The policy enforcement service may be deployed in one or more of the locations depicted in FIG. 1 by policy enforcement services 170, 172, 174, 176, 178, 180, 182, and 184. The policy enforcement service may be deployed on the same or separate hardware as a boundary control subsystem (such as boundary control subsystem 120 of FIG. 1) or a policy subsystem (such as policy subsystem 150 of FIG. 1). The new or different policy enforcement service may be implemented on the same or different hardware as other policy enforcement services. The new or different policy enforcement service may be implemented as a virtual machine on the same or different hardware as other components of FIG. 1 that may be implemented on a virtual machine.

The steps of FIG. 9 and the configuration and components of FIG. 1 may provide one or more advantages. For example, adding security services to a system such as system 100 of FIG. 1 may avoid having to extensively modify elements such as guard 110 of FIG. 1. Rather, new policy enforcement services may be created and policies or configuration data of elements such as guard 110 and/or policy subsystems 150 and 160 of FIG. 1 may be modified. As another example, existing security or policy services may be quickly implemented on a cross-domain validation system.

Although the present disclosure has been described with several embodiments, diverse changes, substitutions, variations, alterations, and modifications may be suggested to one skilled in the art, and it is intended that the present disclosure encompass all such changes, substitutions, variations, alterations, and modifications as fall within the spirit and scope of the appended claims.

What is claimed is:

1. A method comprising:
   receiving, at a first service node, from a validation system, a request to apply a first policy service to a message received from a first entity, the validation system residing on a first network, the validation system configured to determine whether the message may be transmitted to a second entity on a second network by validating a plurality of tokens associated with the message, the plurality of tokens being generated based on requests by the validation system and corresponding to the message received from the first entity, the plurality of tokens comprising tokens generated by the first service node applying the first policy service to the message and a second service node applying a second policy service to the message, none of the plurality of tokens being generated based on application of a policy service to the second entity;
   receiving, at the first service node, at least one result from a policy service engine of applying the first policy service to the message;
   determining, at the first service node, at least one predefined assertion based on the received at least one result;
   generating a first token by encrypting the at least one predefined assertion using a first parameter associated with the first service node and not the second service node; and
   sending the message and the first token to the validation system.

2. The method of claim 1, wherein:
   the first network comprises a first security level; and
   the second network comprises a second security level that is different than the first security level.

3. The method of claim 1, wherein the first service node resides on a third network different than the first network.

4. The method of claim 1, wherein the first parameter is a private key associated with the first service node.

5. The method of claim 1, further comprising:
   determining, at the first service node, a set of instructions for the policy service engine in response to receiving the request to apply the first policy service to the message;
   sending the set of instructions to the policy service engine; and
   wherein the at least one result is received in response to sending the set of instructions to the policy service engine.

6. The method of claim 1, further comprising sending, by the first service node, a file to the validation system with the message, the file generated by the policy service engine when applying the first policy service to the message.

7. The method of claim 1, further comprising:
   determining, at the first service node, a first hash based on the request;
   determining, at the first service node, a second hash based on the at least one result; and
   sending the first hash and the second hash with the message to the validation system.

8. The method of claim 1, wherein the first service node receives the at least one result from the policy service engine asynchronously.

9. An apparatus comprising:
   a network interface configured to receive from a validation system a request to apply a first policy service to a message received from a first entity, the validation system residing on a first network, the validation system configured to determine whether the message may be transmitted to a second entity on a second network by validating that the message comprises a plurality of tokens, the plurality of tokens being generated based on requests by the validation system and corresponding to the message received from the first entity, the plurality of tokens comprising tokens generated by the apparatus applying the first policy service to the message and a second service node applying a second policy service to the message, none of the plurality of tokens being generated based on application of a policy service to the second entity;
   at least one processor configured to:
      receive at least one result from a policy service engine of applying the first policy service to the message;
      determine at least one predefined assertion based on the received at least one result;
      generate a first token by encrypting the at least one predefined assertion using a first parameter associated with the first service node and not the second service node; and
      send the message and the first token to the validation system.

10. The apparatus of claim 9, wherein:
    the first network comprises a first security level; and
    the second network comprises a second security level that is different than the first security level.

11. The apparatus of claim 9, wherein the apparatus resides on a third network different than the first network.

12. The apparatus of claim 9, wherein the first parameter is a private key associated with the apparatus.

13. The apparatus of claim 9, wherein the at least one processor is further configured to:
    determine a set of instructions for the policy service engine in response to receiving the request to apply the first policy service to the message;
    sending the set of instructions to the policy service engine; and
    wherein the at least one result is received in response to sending the set of instructions to the policy service engine.

14. The apparatus of claim 9, wherein the at least one processor is further configured to send a file with the message to the validation system, the file generated by the policy service engine when applying the first policy service to the message.

15. The apparatus of claim 9, wherein the at least one processor is further configured to:
   determine a first hash based on the request;
   determine a second hash based on the at least one result; and
   send the first hash and the second hash with the message to the validation system.

16. The apparatus of claim 9, wherein the at least one result is received from the policy service engine asynchronously.

17. At least one non-transitory computer-readable medium comprising software that, when executed by at least one processor, is configured to:
   receive, at a first service node, from a validation system, a request to apply a first policy service to a message received from a first entity, the validation system residing on a first network, the validation system configured to determine whether the message may be transmitted to a second entity on a second network by validating that the message comprises a plurality of tokens, the plurality of tokens being generated based on requests by the validation system and corresponding to the message received from the first entity, the plurality of tokens comprising tokens generated by the first service node applying the first policy service to the message and a second service node applying a second policy service to the message, none of the plurality of tokens being generated based on application of a policy service to the second entity;
   receive, at the first service node, at least one result from a policy service engine of applying the first policy service to the message;
   determine, at the first service node, at least one predefined assertion based on the received at least one result;
   generate a first token by encrypting the at least one predefined assertion using a first parameter associated with the first service node and not the second service node; and
   send the message and the first token to the validation system.

18. The at least one computer-readable medium of claim 17, wherein:
   the first network comprises a first security level; and
   the second network comprises a second security level that is different than the first security level.

19. The at least one computer-readable medium of claim 17, wherein the first service node resides on a third network different than the first network.

20. The at least one computer-readable medium of claim 17, wherein the first parameter is a private key associated with the first service node.

21. The at least one computer-readable medium of claim 17, wherein the software is further configured to:
   determine a set of instructions for the policy service engine in response to receiving the request to apply the first policy service to the message;
   send the set of instructions to the policy service engine; and
   wherein the at least one result is received in response to sending the set of instructions to the policy service engine.

22. The at least one computer-readable medium of claim 17, wherein the software is further configured to send a file with the message to the validation system, the file generated by the policy service engine when applying the first policy service to the message.

23. The at least one computer-readable medium of claim 17, wherein the software is further configured to:
   determine a first hash based on the request;
   determine a second hash based on the at least one result; and
   send the first hash and the second hash with the message to the validation system.

24. The at least one computer-readable medium of claim 17, wherein the at least one result is received from the policy service engine asynchronously.

* * * * *